Jan. 19, 1965 K. STUTZ 3,166,643

SOUND REPRODUCING DEVICE FOR ELEVATORS

Filed Oct. 4, 1960 2 Sheets-Sheet 2

United States Patent Office 3,166,643

Patented Jan. 19, 1965

3,166,643

SOUND REPRODUCING DEVICE FOR ELEVATORS

Karl Stutz, Hinterbramberg 6, Lucerne, Switzerland

Filed Oct. 4, 1960, Ser. No. 60,459

Claims priority, application Switzerland, Oct. 5, 1959, 79,112

3 Claims. (Cl. 179—100.1)

Figure 1:
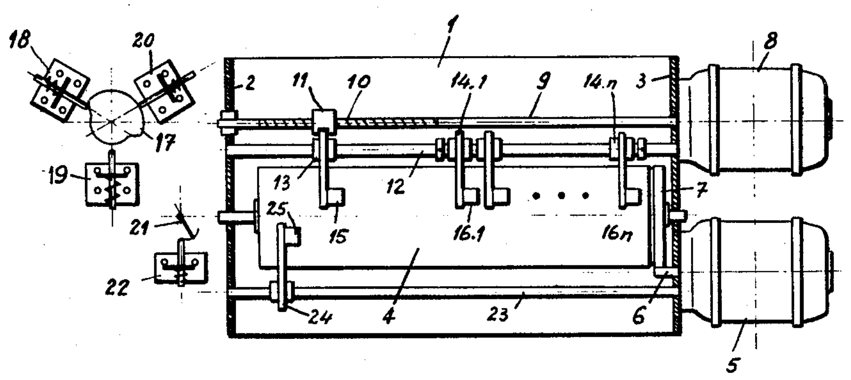

The invention relates to elevators and more specifically to a sound reproducing device for making announcements in an elevator cab.

In sound reproducing devices for elevators which have been proposed previously, sound tapes have been employed. Thus, a sound reproducing device has been proposed which uses two sound tapes, each tape being allocated to one sense of movement of the elevator. The arrangement is such that while one of the tapes is being used for reproduction the other tape is being rewound. One and the same announcement corresponds to each stop. Announcements which do not correspond to a predetermined stop cannot be made. However, it appears that it is often necessary to make such announcements, for example to announce an overload, a breakdown, the sense of direction of travelling. Such announcements are not possible when using the heretofore proposed device.

It has also been suggested to use a separate endless sound tape for each announcement, each tape having its own driving mechanism, its own sound head and its own amplifier. The appropriate sound tape is operated as required. If it is desired to announce the floor number and in addition to make a number of other announcements, the suggested arrangement is expensive. Therefore its use is limited.

Generally speaking, the use of sound tapes for elevators is unsuitable since with sound tapes much time is required for locating a particular announcement on a tape.

It is an object of the invention to provide a sound reproducing device for making announcements in an elevator cab which are dependent on the location of the elevator cab as well as announcements which are independent of the location of the elevator cab. The device is nevertheless inexpensive and requiring little time for locating a particular announcement on a tape.

The invention contemplates a sound reproducing device for elevators for making announcements by means of a loud speaker in an elevator cab. The device includes a rotatable drum having a magnetizable medium on its periphery on which announcements are recorded in closed peripheral lines lying side by side. The peripheral lines may be parallel to one another. A motor may be provided for rotating the drum. Preferably, the closed peripheral lines form two separate groups. Means are provided for producing announcements of one of the groups automatically in dependence on the position of the elevator cab. Control means are provided for producing an announcement of the other group independently of the position of the elevator cab on operation of said control means. Means may be provided for automatically operating the control means in dependence on an extraordinary operating condition of the elevator. Advantageously, the reproducing means comprise a sound pick-up device common to the lines of the one group. The pick-up device is displaceable relatively to the periphery of the drum. Means are also included for automatically operating the pick-up device in dependence on the position of the elevator cab. Contrary thereto, the control means may comprise a plurality of separate pick-up devices, each for one line of the other group. And means are provided for operating the separate pick-up devices, one at a time, independently on the position of the elevator cab.

Figure 3:
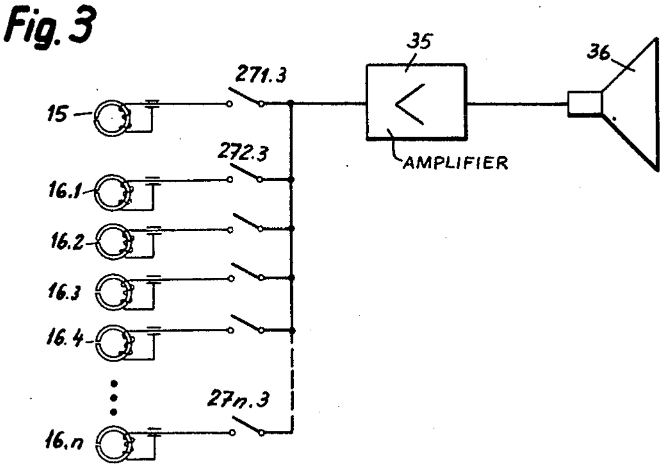
Figure 2:
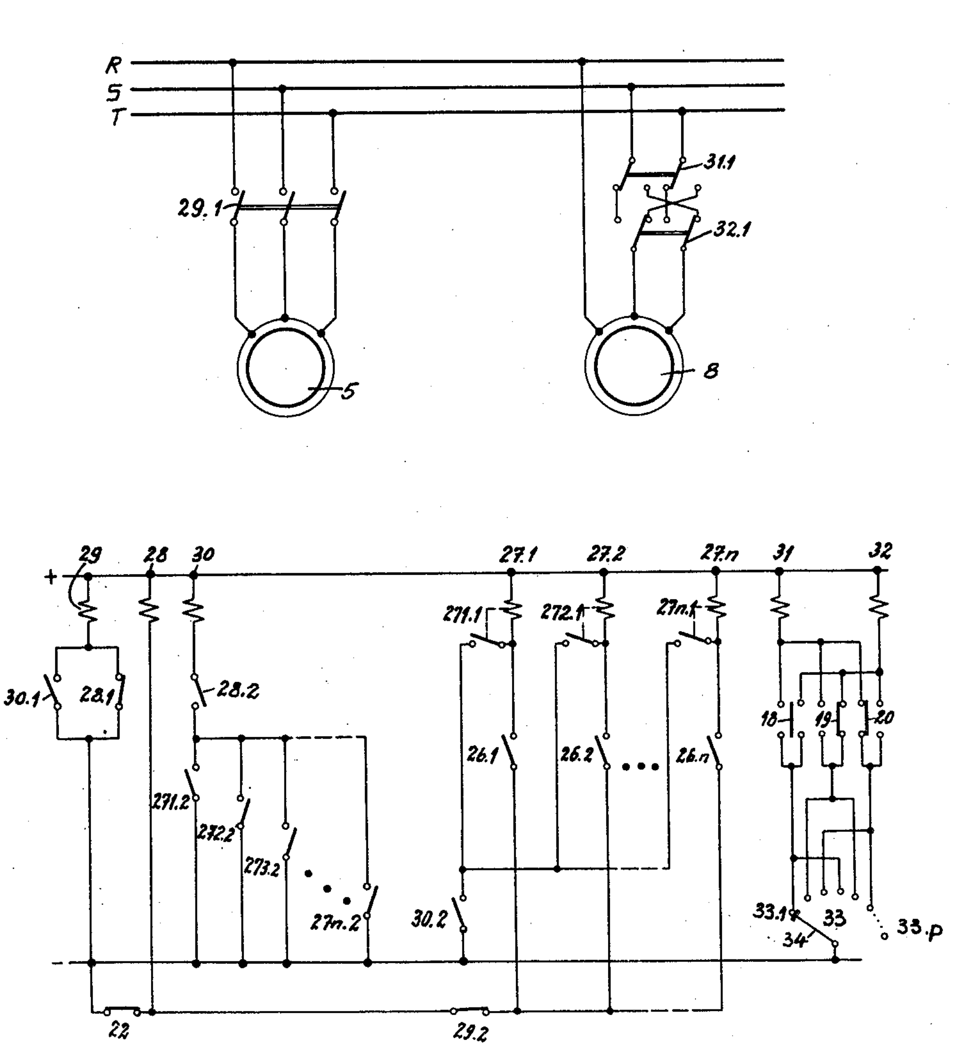

To make the invention clearly understood reference will now be made to the accompanying drawings, which are given by way of example, and in which:

FIG. 1 diagrammatically illustrates the mechanical part of an embodiment of the invention, FIG. 2 is a circuit diagram of the electrical part of the embodiment of FIG. 1, and FIG. 3 is a circuit diagram of the amplifier part of the embodiment of FIG. 1.

The apparatus of FIG. 1 comprises a base plate 1 carrying two side plates 2 and 3 in which a magnetic drum 4 is mounted which is rotatable by an electric motor 5 fixed to the side plate 3. The drum 4 comprises a friction wheel 7 engaging a driving shaft 6 of the motor 5 for transmitting rotation from the motor 5 to the drum 4. A second electric motor 8 is fixed to the side plate 3 for driving a spindle 9 extending parallel to the longitudinal axis of the drum 4 and adjacent thereto. Spindle 9 is rotatably mounted in the side plates 2 and 3. A part 10 of the spindle 9 is provided with screw-threads for engaging a nut 11. The arrangement is such that on rotation of the spindle 9 the nut 11 rides along the screw-threaded part 10 of the spindle 9. A shaft 12 is provided which is arranged parallel to the spindle 9 and carries a displaceable arm 13 and a number of fixed arms 14.1 to 14.*n* which are not displaceable in the axial direction of the shaft 12. The displaceable arm 13 is connected to the nut 11 and is displaceable by the nut 11 in the axial direction of the shaft 12. A pick-up device 15 is fixed to the arm 13, and pick-up devices 16.1 to 16.*n* are fixed to the arms 14.1 to 14.*n* respectively.

A cam 17 is provided on the spindle 9 for operating switch-over contacts 18, 19 and 20. A cam segment 21 acting on a contact 22 is operatively connected to the drum 4.

A shaft 23 is mounted in the side plates 2 and 3, the shaft 23 being parallel to the axis of the drum 4 and carrying an arm 24 displaceable manually and being provided with an erasing head 25.

The circuit diagram of the apparatus of FIG. 1 is shown in FIG. 2 and will now be described. A three-phase supply source RST supplies the two motors 5 and 8. Terminals + and − of a direct current supply source supplies operating power for the relays. In a circuit connected to the direct current supply source, a control switch 26.1 of the elevator control is provided. Control switch 26.1 also initiates announcements in dependence on the floors. Further control switches 26.2 to 26.*n* are provided for initiating other announcements. The switches 26.1, 26.2 to 26.*n* each operate a relay 27.1, 27.2 to 27.*n* respectively. These relays are provided with holding contacts 271.1, 272.1 to 27*n*.1 respectively and with operating contacts 271.2, 272.2 to 27*n*.2. In the same circuit, a coil 29 and a relay 28 are provided. Relay 28 has a holding contact 28.1 and an operating contact 28.2. The coil 29 forms part of a 3-pole relay switch with main contacts 29.1 and a normally closed contact 29.2. The main contacts 29.1 connect source RST to the motor 5. In the direct current circuit, a relay 30 is provided having two operating contacts 30.1 and 30.2. For the circuit of the motor 8 two relays 31 and 32 are provided having two switch over contacts 31.1 and 32.1 respectively.

A contact bank 33 has contacts 33.1 to 33.*p* corresponding to the floors and which are, for example, arranged on a floor indicating mechanism of the elevator. A wiper 34 is provided whose position corresponds to the position of the cab.

The embodiment also includes an amplifier 35 (see FIG. 3) and a loud speaker 36 which is arranged in the elevator cab. The pick-ups 15 and 16.1 to 16.*n* are connected to the amplifier 35 via operating contacts 271.3 to 27*n*.3 of corresponding relays 271 to 27*n*.

The apparatus operates as follows:

The various announcements are provided by suitably magnetizing the magnetic medium on the periphery of the drum 4. In other words initial recordings are made. The magnetic medium may be a magnetic layer of, or a magnetic coating on, or a magnetic sheet carried by, the drum 4. An announcement corresponds approximately to one revolution of the drum 4. The announcements of the floor numbers are provided side by side so that they can be effected successively by the movable pick-up 15. The other announcements are effected each by a separate pick-up 16.1 to 16.*n*. Each pick-up is, when required, connectable by means of the contact 271.3 to 27*n*.3 respectively to the amplifier 35 the output of which is fed to the loud speaker 36. After each revolution of the drum 4, the cam segment 21 opens the contact 22 for a short time. Immediately after the contact 22 has been closed again, the drum 4 comes to rest. Thus on starting the drum the contact 22, which lies in the circuit for the relay 28, is energized, whereby its contact 28.1 is opened and contact 28.2 is closed. An announcement is initiated by one of the control switches 26.1, 26.2 to 26.*n*. If, for example, the control switch 26.2 is operated, relay 27.2 is energized and its contacts 272.1, 272.2 and 272.3 are closed. Across contact 272.2 relay 30 is energized so that its operating contacts 30.1 and 30.2 are closed. Relays 272 holds itself by means of contacts 30.2 and 272.1. Contact 30.1 closes a circuit for coil 29 so that the relay switch 29.1 starts the motor 5 which causes the drum 4 to rotate. Since the operating contact 272.3 is closed the corresponding announcement is made by the loud speaker 36. At the end of a single revolution of the drum 4, contact 22 is interrupted. Relay 28 is de-energized and its contact 28.2 interrupts the current circuit of relay 30. Contact 30.2 interrupts the holding circuit of relay 27.2 so that by means of contact 272.3 the connection between pick-up and amplifier is interrupted. Notwithstanding the opening of contact 30.1 coil 29 remains energized across contact 28.1. After the drum 4 has completed its revolution, contact 22 is closed again and causes the relay 28 to be again energized. Contact 28.1 opens and interrupts the current circuit of the relay switch 29 so that the motor 5 is stopped. Contact 28.2 is closed but this does not lead to any action and contact 29.2 prevents a second control action becoming effective if a first control action is still effective.

The lateral displacement of the pick-up 15 is effected as follows:

Let it be assumed that the elevator cab is stationary at the first floor. The wiper 34 contacts the contact bank at its contact 33.1 as shown in FIGURE 2. Since contact 18 is in its neutral position no action takes place. When now the cab travels to another floor, for example to the second floor, the wiper 34 moves to contact 33.2. The relay switch 32 is energized across contact 19 and by means of its switch-over contacts 32.1 starts the motor 8 to rotate in a sense corresponding to the sense in which the cab travels. The cam 17, which is connected to the motor 8, after a third of a revolution moves contact 19 into its centre position whereby the motor 8 is arrested. Simultaneously the arm 15 is brought into a position corresponding to the second floor by the screw-threaded part 10 of the spindle 9. Contacts 18 and 20 are so controlled by the cam 17 that during subsequent travelling of the cab to the third floor the relay switch 32 is energized whereas during subsequent travelling of the cab to the first floor the relay switch 31 is energized.

Hence, during the upward travel of the cab the motor 8 is so rotated that the screw-threaded part 10 of spindle 9 moves the arm 15 further to the right as viewed in FIG. 1 and moves the arm 15 to the left during downward travel of the cab. By control means of the elevator the announcement of the floor number is released by a contact member. This is effected by closing control switch 261. Relay 271 is energized and the operating steps initiated by relay 272, previously described, are repeated. For altering an announcement without removing the drum, the erasing head is displaceably provided on shaft 23.

What I claim is:

1. A sound reproducing device for elevators for making announcements by means of a loudspeaker in an elevator cab, said device comprising a rotatable drum having a magnetizable medium at its periphery on which announcements are recorded in closed peripheral lines lying side by side and forming first and second groups, means for reproducing announcements on said first group automatically in dependence of the position of the elevator cab, control means for producing an announcement from said second group independently of the position of the elevator cab and upon operation of said control means, a first electric motor for rotating said drum, said means for producing announcements comprising a sound pick-up device common to the lines of said first group, means including a second electric motor for axially displacing said sound pick-up device relatively to the periphery of said drum, means for automatically operating said pick-up device in dependence of the position of the elevator cab, and motor control means for controlling said first electric motor, said motor control means including a relay switch means for starting said first motor when in a first state, means for energizing said relay switch means to said first state, said relay switch means stopping said first motor when in said second state, auxiliary switch means for energizing said relay switch means to said second state, and a cam connected to said drum for operating said auxiliary switch means.

2. A sound reproducing device for elevators for making announcements by means of a loudspeaker in an elevator cab, said device comprising a rotatable drum having a magnetizable medium at its periphery on which announcements are recorded in closed peripheral lines lying side by side and forming two separate groups, pick-up means for reproducing announcements on one of the groups automatically in dependence of the position of the elevator cab, a shaft adjacent to said drum and disposed parallel to the axis of said drum, said shaft including a screw-threaded portion, a nut on said screw threaded-portion, an arm connected to said nut for carrying said pick-up means, a first electric motor for rotating said shaft so that said pick-up means moves axially past said drum and first group of lines thereon, control means for producing an announcement from the other group independently of the position of the elevator cab and upon operation of said control means, a second electric motor for rotating said drum, and means for automatically operating said pick-up means in dependence of the position of the elevator cab.

3. A sound reproducing device for elevators for making announcements by means of a loudspeaker in an elevator cab, said device comprising: a rotatable drum having a magnetizable medium at its periphery on which announcements are recorded in closed peripheral lines lying side by side and forming two separate groups; means for reproducing announcements on one of the groups automatically in dependence of the position of the elevator cab; control means for producing an announcement from the other group independently of the position of the elevator cab and upon operation of said control means; a first electric motor for rotating said drum; said means for producing announcements comprising a sound pick-up device common to the lines of one of said group; a second electric motor for axially displacing said pick-up device relative to the periphery of said drum, and means for controlling said second electric motor including a wiper means and plurality of contact members for contacting by said wiper means, the position of said wiper means with respect to said contact members being dependent on the position of the elevator cab, and a plurality of relay switches connected to and operable by said contact members for controlling said second electric motor.

References Cited in the file of this patent

UNITED STATES PATENTS

| | | |
|---|---|---|
| 2,137,157 | Crudo et al. | Nov. 15, 1938 |
| 2,435,066 | Barsh | Jan. 27, 1948 |
| 2,523,359 | Diebele | Sept. 26, 1950 |
| 2,571,973 | Walker | Oct. 16, 1951 |
| 2,832,841 | Eldridge | Apr. 25, 1958 |
| 2,991,448 | Diamond et al. | July 28, 1961 |